United States Patent
Hioki et al.

(10) Patent No.: US 9,183,794 B2
(45) Date of Patent: Nov. 10, 2015

(54) DISPLAY APPARATUS AND DRIVING METHOD THEREOF

(75) Inventors: Tsuyoshi Hioki, Yokohama (JP); Yutaka Nakai, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 627 days.

(21) Appl. No.: 12/686,037

(22) Filed: Jan. 12, 2010

(65) Prior Publication Data
US 2010/0177091 A1 Jul. 15, 2010

(30) Foreign Application Priority Data

Jan. 14, 2009 (JP) ................................ 2009-005849

(51) Int. Cl.
*G09G 3/34* (2006.01)
*F21V 8/00* (2006.01)
*G02B 6/35* (2006.01)

(52) U.S. Cl.
CPC .............. *G09G 3/3473* (2013.01); *G02B 6/001* (2013.01); *G02B 6/3522* (2013.01); *G02B 6/0035* (2013.01); *G09G 2310/0267* (2013.01); *G09G 2310/0283* (2013.01)

(58) Field of Classification Search
CPC .................. G09G 2310/02; G09G 2310/0202; G09G 2310/0213; G09G 3/3473
USPC .............................................. 345/76, 84, 214
See application file for complete search history.

(56) References Cited

U.S. PATENT DOCUMENTS

| | | | |
|---|---|---|---|
| 7,542,017 B2 | 6/2009 | Hioki et al. | |
| 2002/0027536 A1* | 3/2002 | Kimura | 345/75.1 |
| 2002/0140879 A1* | 10/2002 | Fujieda | 349/69 |
| 2006/0284904 A1* | 12/2006 | Ng | 345/691 |
| 2007/0080905 A1* | 4/2007 | Takahara | 345/76 |
| 2009/0243962 A1 | 10/2009 | Hioki et al. | |
| 2009/0243980 A1* | 10/2009 | Nakai et al. | 345/84 |
| 2009/0245741 A1 | 10/2009 | Hioki et al. | |
| 2009/0322736 A1 | 12/2009 | Hioki et al. | |

FOREIGN PATENT DOCUMENTS

| | | |
|---|---|---|
| JP | 1-185692 | 7/1989 |
| JP | 6-59295 | 3/1994 |
| JP | 11-38935 | 2/1999 |

(Continued)

OTHER PUBLICATIONS

U.S. Appl. No. 13/045,222, filed Mar. 10, 2011, Hioki, et al.

(Continued)

*Primary Examiner* — Mark Regn
(74) *Attorney, Agent, or Firm* — Oblon, McClelland, Maier & Neustadt, L.L.P.

(57) ABSTRACT

A display apparatus includes a plurality of light sources which emit light beams, a plurality of optical waveguides which guide the light beams, a plurality of scanning lines which are arranged so as to intersect with the optical waveguides, a plurality of light output elements which, at intersections of the optical waveguides and the scanning lines, output the light beams guided in the optical waveguides by electric signals from the scanning lines, and a scanning line driving unit which drives the scanning lines in a direction opposite to a direction in which the light beams are guided.

14 Claims, 8 Drawing Sheets

(56) References Cited

FOREIGN PATENT DOCUMENTS

| | | |
|---|---|---|
| JP | 2000-98269 | 4/2000 |
| JP | 2002-40339 | 2/2002 |
| JP | 2004-118001 | 4/2004 |
| JP | 2005-227324 | 8/2005 |
| JP | 2006-30529 | 2/2006 |

OTHER PUBLICATIONS

U.S. Appl. No. 12/979,902, filed Dec. 28, 2010, Nakai et al.

U.S. Appl. No. 13/242,087, filed Sep. 23, 2011, Hioki, et al.

First Office Action issued Sep. 18, 2012 in Japanese Patent Application No. 2009-005849 (with English translation).

* cited by examiner

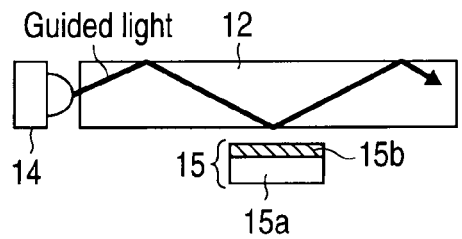
F I G. 3A
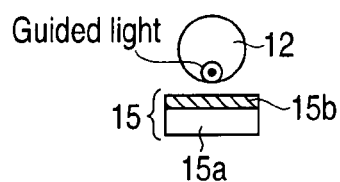
F I G. 3B
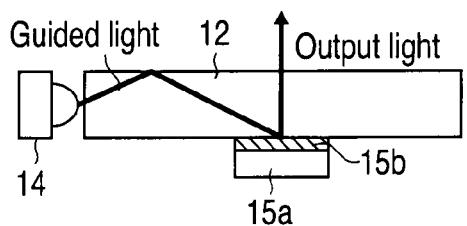
F I G. 4A
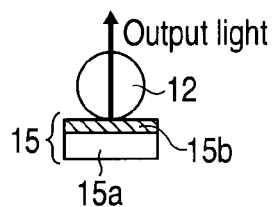
F I G. 4B

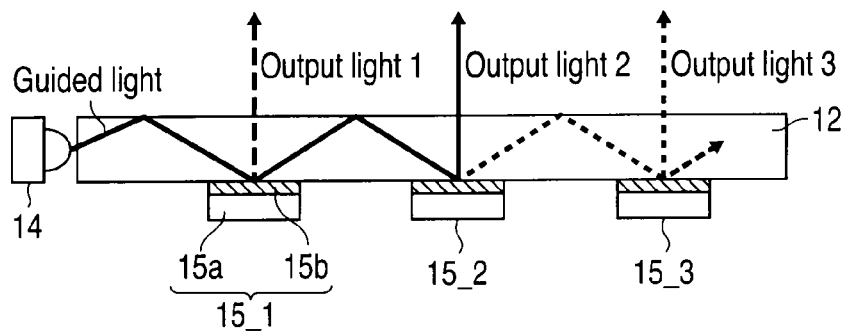
F I G. 5
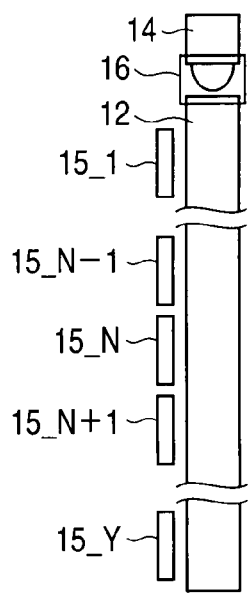 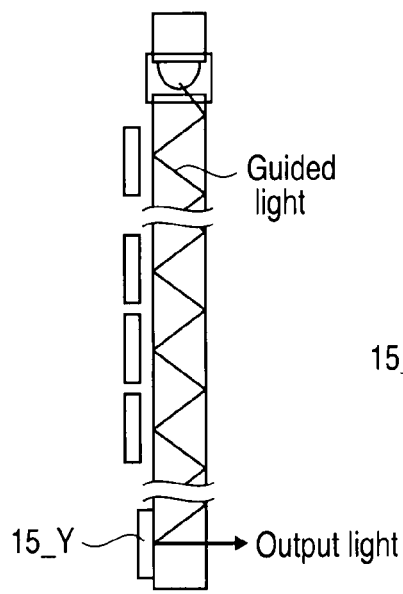 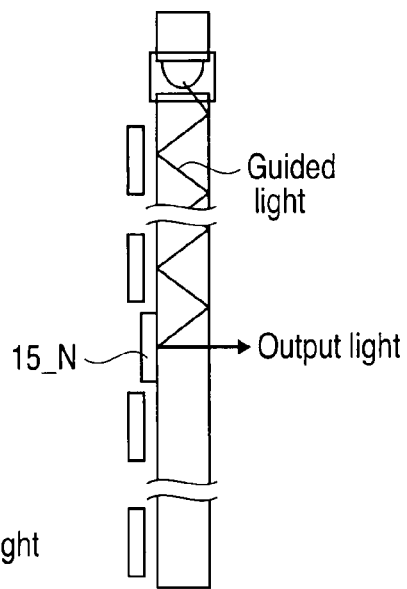
F I G. 6A    F I G. 6B    F I G. 6C

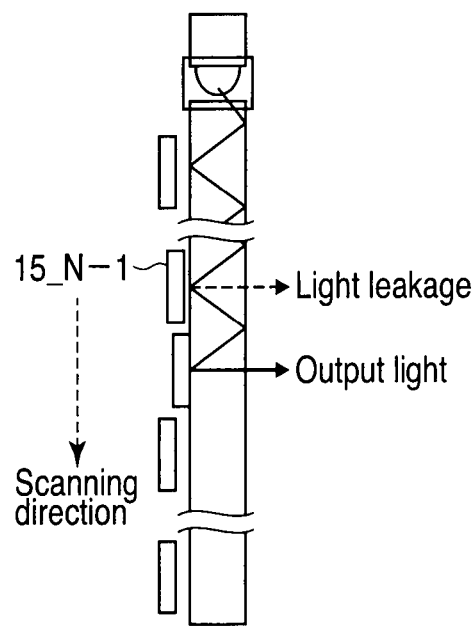
F I G. 7A
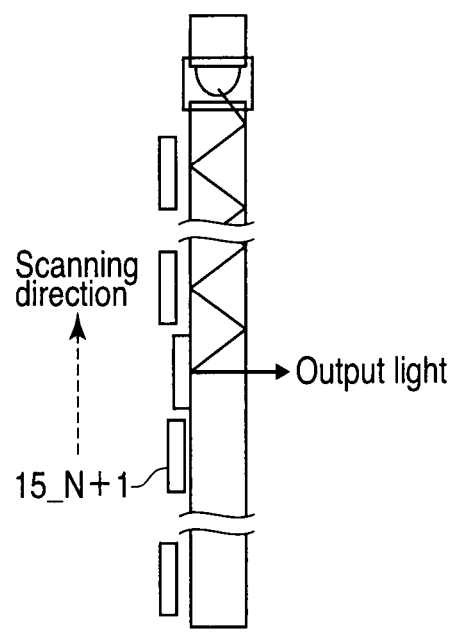
F I G. 7B

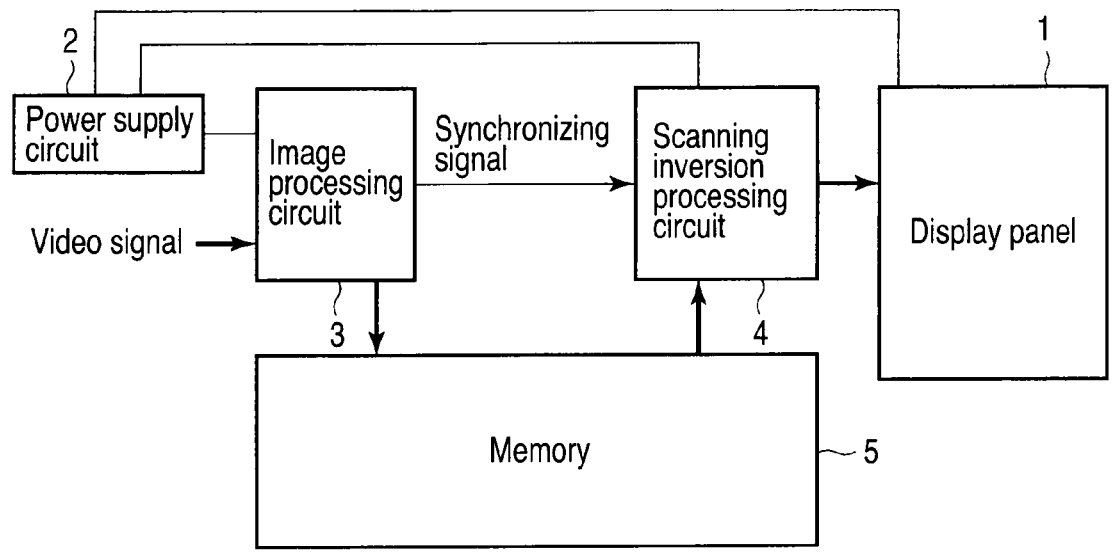
F I G. 11
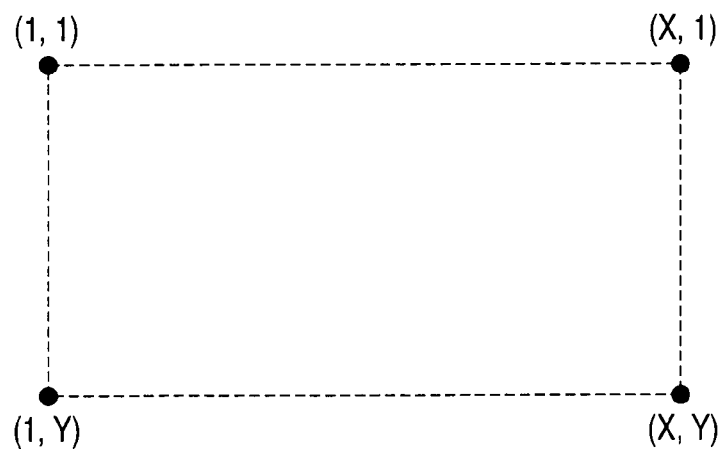
F I G. 12

(101)(010)(010)
↓ Inversion
(010)(010)(101)
F I G. 15
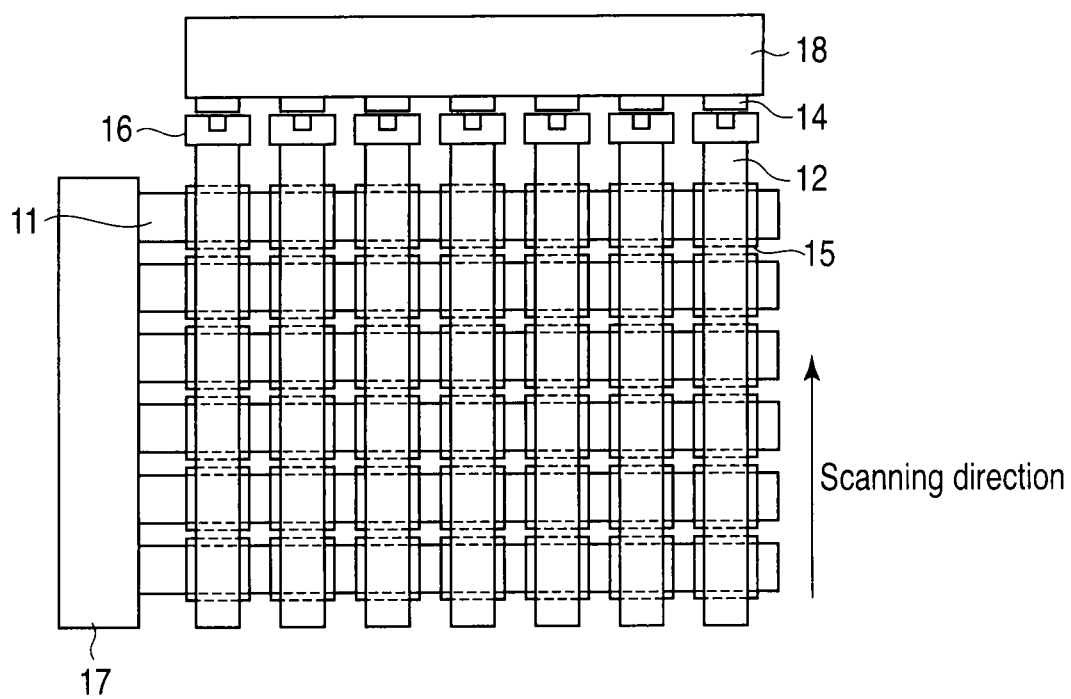
F I G. 16

DISPLAY APPARATUS AND DRIVING METHOD THEREOF

CROSS-REFERENCE TO RELATED APPLICATIONS

This application is based upon and claims the benefit of priority from prior Japanese Patent Application No. 2009-005849, filed Jan. 14, 2009, the entire contents of which are incorporated herein by reference.

BACKGROUND OF THE INVENTION

1. Field of the Invention

The present invention is related to a display apparatus including an integrated body of an optical waveguide and a driving method thereof.

2. Description of the Related Art

Currently, as a widely used display apparatus, there are, for example, CRTs (Cathode Ray Tubes), LCDs (Liquid Crystal Displays), PDPs (Plasma Display Panels), OLEDs (Organic Light Emitting Displays) and FEDs (Field Emission Displays). As for CRT, since depth is required in size due to carrying out electronic line scanning, currently, LCD, PDP, OLED and FED etc., which are referred to as FPDs (Flat Panel Displays), are becoming mainstream. Each FPD performs light modulations utilizing light emitting mechanisms or light valves etc. for each two-dimensionally arranged pixel. In order to transmit analogue information regarding this light modulation to each pixel, FPD is configured to take advantage of a matrix structure which has high accuracy. Accordingly, when preparing the FPD, techniques such as carrying out film forming by vacuum processes, such as a spatter method, which uses, for example, a large area substrate such as a glass substrate, or a highly accurate shape formation technique represented in photo-etching processes are adapted.

Meanwhile, a method which does not carry out light modulation on each pixel positioned at the intersection point of matrix wiring is also being considered. In this method, light modulation etc. are carried out on portions other than the pixel portions. Light is emitted after being guided to a desired position. This configuration allows light which is incident from a light source upon an optical waveguide so as to satisfy total reflection conditions to have its light emitting position defined at a position in a part of the optical waveguide by, for example, displacement of a light output element. Further, according to this method, the role of each pixel portion can be reduced to guiding light adjusted to a desired strength and selecting light output.

For example, JP-A 1-185692 (KOKAI) suggests a method which, instead of providing a light source and a light modulating element such as a light valve to each pixel, carries out light modulation by using a strength modulator attached to a light source. After the light is guided to a desired pixel position, it is emitted at the pixel position. In other words, after the light whose strength is adjusted at the light source is transmitted to a desired position by light guiding under total reflection conditions of a core and clad, which are optical waveguides, refractivity of a core material at such position is changed, and light is emitted. By changing the refractivity of the core material partially by applying electric field, it becomes an area which does not satisfy total reflection conditions in the core and clad. Therefore, in an area which does not satisfy total reflection condition, the guided light is emitted from a core which is an optical waveguide.

However, a scanning driving method for display action is required in a display apparatus having a structure integrated by a plurality of one-dimensional optical waveguides such as optical fibers. In the above mentioned display apparatus structure, scanning applies electric field to an optical waveguide and changes reflectivity to determine a scanning position. In order to maintain favorable display performance, a changing of refractivity at the correct time is required.

Further, since the scanning determines the scanning position by selecting contact or noncontact with the optical waveguide, when not in contact, a spacer should define a noncontact state between the optical waveguide and the scanning line. Therefore, since it is necessary to control space between the optical waveguide and each signal line strictly in accordance with a displaceable amount upon selecting the scanning line, strict control in production, such as controlling the height of the spacer for structure formation, is required.

BRIEF SUMMARY OF THE INVENTION

According to an aspect of the present invention, it is provided that a display apparatus includes a plurality of light sources which emit light beams; a plurality of optical waveguides which guide the light beams; a plurality of scanning lines which are arranged so as to intersect with the optical waveguides; a plurality of light output elements which, at intersections of the optical waveguides and the scanning lines, output the light beams guided in the optical waveguides by electric signals from the scanning lines; and a scanning line driving unit which drives the scanning lines in a direction opposite to a direction in which the light beams are guided.

According to another aspect of the present invention, it is provided that a method of driving a display apparatus which includes a plurality of light sources which emit light beams, a plurality of optical waveguides guiding the light beams, a plurality of scanning lines arranged so as to intersect with the optical waveguides, and a plurality of light output elements arranged at intersections of the optical waveguides and the scanning lines, the method includes driving the scanning lines in a direction opposite the light beams guiding direction, and outputting, by the light output elements, the light beams which is guided in the optical waveguides by electric signals from the scanning lines.

BRIEF DESCRIPTION OF THE SEVERAL VIEWS OF THE DRAWINGS

FIG. 3A is a schematic view showing the performance of a light output element when light is guided.

FIG. 3B is a schematic view showing the performance of a light output element when light is guided.

FIG. 4A is a schematic view showing the performance of a light output element upon scanning.

FIG. 4B is a schematic view showing the performance of a light output element upon scanning.

FIG. 5 is a schematic view showing a performance in the case where a plurality of light output elements are arranged in parallel.

FIG. 6A is a schematic view showing a light output performance in the display apparatus of the present embodiment.

FIG. 6B is a schematic view showing a light output performance in the display apparatus of the present embodiment.

FIG. 6C is a schematic view showing a light output performance in the display apparatus of the present embodiment.

FIG. 7A is a schematic view showing a light output performance upon scanning in a usual display apparatus.

FIG. 7B is a schematic view showing a light output performance upon scanning in the display apparatus of the present embodiment.

FIG. 11 shows a configuration example of a display system in the present embodiment.

FIG. 12 shows a pixel arrangement of a video signal.

FIG. 15 shows a processing example of the scanning inversion processing circuit.

FIG. 16 shows another configuration example of a display apparatus according to the present embodiment.

DETAILED DESCRIPTION OF THE INVENTION

Embodiments of the present invention will be explained in detail by reference to the drawings, as follows.

Figure 1:
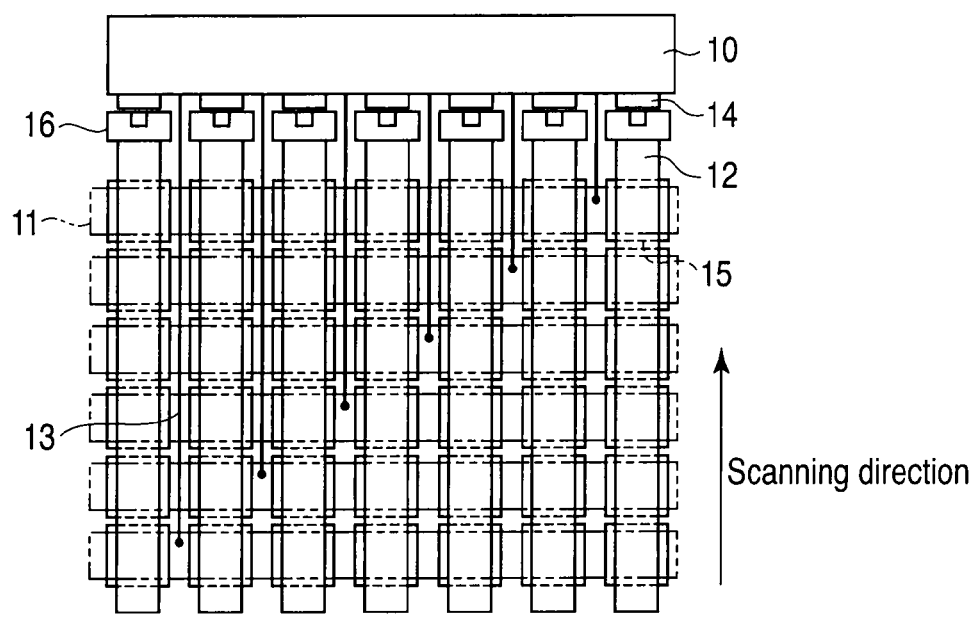
FIG. 1 shows a configuration example of a display apparatus according to a present embodiment.

As shown in FIG. 1, a display apparatus includes light sources 14 for introducing a light signal (light beam), optical waveguides 12 for guiding the light signal from the light source 14, scanning lines 11, a scanning feeder 13 for operating the scanning lines 11, light output elements 15 arranged at each intersection of the scanning lines 11 and the optical waveguides 12, connectors 16 which connect the light sources 14 and the optical waveguides 12, and a driving circuit 10 which drives the light sources 14 and the scanning lines 11. In other words, in the display apparatus, the light signal from the light source 14 propagates through the optical waveguide 12, and, by applying, for example, voltage on the scanning line 11, the light output elements 15 is operated. In this manner the light signal is taken out on the display surface from the optical waveguide 12. Here, the light output elements 15 changes refractivity of the optical waveguide 12 by contacting or noncontacting to the optical waveguide 12 under the control of electric signals from the scanning lines 11. Further, as shown in FIG. 1, the driving circuit 10 drives the scanning line 11 in sequence from the opposite direction of which the light signal from the light source 14 propagates, i.e. the far side from the light source 14.

Figure 2:
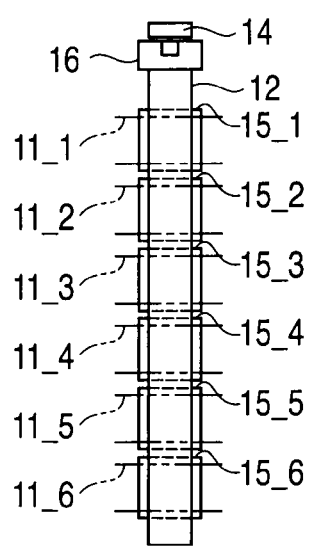
FIG. 2 shows a configuration example of pixel arrangement in the display apparatus of the present embodiment.

FIG. 2 shows an optical waveguide 12 in the display apparatus shown in FIG. 1. For example, in the case of numbering the scanning lines 11 as 11_1, 11_2, 11_3, . . . , from the closest to the light source 14, it is possible to set each of the light output element 15_1, 15_2, 15_3, . . . , arranged at the intersection of the optical waveguide 12 and each scanning line 11 as pixel 1, pixel 2, pixel 3, . . . . Accordingly, assuming that each optical waveguide 12 in FIG. 1 is numbered optical waveguide 12 numbers, such as 12_1, 12_2, 12_3, . . . , from the left side of the drawing, an X side is defined as 12_1, 12_2, . . . 12_X, and a Y side is defined as 11_1, 11_2, . . . , 11_Y. Therefore, each of the light output element of (X, Y) is considered as configuring a matrix. In this manner, the display apparatus is capable of displaying a matrix of the light signal and the electric scanning.

FIGS. 3A, 3B, 4A and 4B are schematic views showing the performance of the light output element 15 used in the present embodiment. FIGS. 3A and 3B do not show the state of scanning. In other words, FIG. 3A is a cross-sectional view along a longitudinal direction of the optical waveguide 12, and FIG. 3B is a cross-sectional view along a direction orthogonal to the longitudinal direction of the optical waveguide 12, in a state where light output is not performed. FIGS. 4A and 4B show the state of scanning. In other words, FIG. 4A is a cross-sectional view along a longitudinal direction of the optical waveguide 12, and FIG. 4B is a cross-sectional view along a direction orthogonal to the longitudinal direction of the optical waveguide 12, in a state where light output is performed.

In the present embodiment, the light output element 15 includes a displacement device 15a which is given an optical function layer 15b. The displacement device 15a is used to control contact or noncontact state of the optical function layer 15b to the optical waveguide 12 to change total reflection conditions in the optical waveguide 12 and perform light output. Accordingly, as the optical function layer 15b, a layer that is provided with, for example, a transparent material having high refractivity or a minute prism structure on its surface can be used. The present embodiment uses an optical function layer 15b which is applied on its surface a material relatively transparent with respect to a wavelength region of the light source and highly refractive, through the intermediary of a layer including scattered particles on an aluminum (Al) thin layer. The material is, for example, an epoxy type resin having a refractivity of approximately 1.65. This is because the display apparatus has the opposite side to which the light output element 15 is positioned, i.e. the surface side of the optical waveguide 12, as the display surface, and has a system of outputting light by reflecting the light output from the optical waveguide 12 on the surface of the Al thin film. However, the present invention is not limited to this reflection mode system, therefore, can also adapt a system which has the light output element 15 side as the display surface. Meanwhile, as for the optical waveguide 12, likewise a plastic optical fiber, an acrylate resin material having refractivity of approximately 1.49 and covered with fluorinated resin which is a low refractive material is used for a portion on which the light output element does not function.

In FIGS. 3A and 3B, since the state of displacement of the displacement device 15a does not cause the optical function layer 15b to contact the optical waveguide 12, the light propagating in total reflection conditions through the optical waveguide 12 propagates throughout the optical waveguide 12 in a state of satisfying total reflection conditions at the light output element 15. This is possible because the space between the optical function layer 15b and the optical waveguide is covered with an atmosphere having a refractivity of approximately 1, which maintains total reflection conditions. In contrast, in FIGS. 4A and 4B, since the optical function layer 15b contacts the optical waveguide 12, total reflectance is disturbed at the boundary surface between the optical waveguide 12 and the optical function layer 15b and causes refraction. The light propagating through the optical waveguide 12 is guided to the optical function layer 15b side by this refraction, which enables light to be output by light scatter caused by the scattered particles or the reflection caused by the aluminum surface in the optical function layer 15b.

In FIG. 5, as a principle of the display apparatus, the performance in the case where a plurality of light output elements 15_1, 15_2 and 15_3 are arranged in parallel is shown schematically. Further, FIG. 5 shows a cross-sectional view along the longitudinal direction of the optical waveguide 12. Here, suppose that the light output elements 15_1, 15_2 and 15_3 are in a state of outputting the light guided in the optical waveguide 12 respectively by 50%, 100% and 50%. Further, the light guided through the optical waveguide 12 is considered as being introduced to fail satisfying total reflection conditions at the light output elements 15_1 to 15_3 and to satisfy total reflection conditions at other optical waveguide portions.

The light emitted from the light source 14 is guided through the optical waveguide 12 while satisfying total reflection conditions and is output at the light output elements 15_1 to 15_3. Under the circumstances, in the case of focusing on the light output element 15_2, it is considered that the light satisfying total reflection conditions from the light source 14 has already been reduced by 50% at the light output element 15_1, which is the nearest to the light source 14. Accordingly, it is considered that only 50% of the amount of light in the optical waveguide 12 close to the light source 14 can be emitted at the light output element 15_2. Meanwhile, as for the light output element 15_3, since all the light which can be emitted has already been emitted at the light output element 15_2, even if the light output element 15_3 had a 50% light output state, the amount of light which can be output from the light output element 153 would be zero.

FIGS. 6A, 6B and 6C show a schematic example of a light output performance in the display apparatus of the present embodiment. FIGS. 6A, 6B and 6C are cross-sectional views along a longitudinal direction of a certain optical waveguide 12. FIG. 6A shows a configuration which includes a light source 14 which generates a light signal and a optical waveguide 12 for guiding the light signal from the light source 14, and in which light output elements 15_1 to 15_Y for outputting light from this optical waveguide 12 are arranged for the number of Y pixels. For example, in a case of performing light output for only the Yth light output element, i.e., the light output element 15 arranged at a furthest position from the light source 14, since optically guided state is maintained from the light output element 15_1 to the light output element 15_Y−1, without considering attenuation or scattering etc. in the optical waveguide 12, the amount of light in the optical waveguide 12 is considered to be able to reach the light output element 15_Y.

Here, suppose that the Nth light output element (hereinafter described as 15_N) counted from the light source side associated with the optical waveguide 15 in FIG. 6C is in a state of performing light output, i.e., is in a state of selecting a scanning line. Here, as is performed in a scanning type display apparatus, when assuming that scanning lines are selected sequentially from the side nearest to the light source 14, light output performance can be shown schematically as in FIG. 7A. Upon the above performance, as for light output element 15_N−1, which is a scanning position one light output element before the light output element 15_N, since it is to be arranged at a position closer to the light source 14 than the light output element 15_N, in the case where optical response delay occurs in the optical output element 15_N−1 after the selection, light leakage will occur as shown by the dashed lines in FIG. 7A.

In contrast, as shown in FIG. 7B, in the case where the scanning lines are selected from the furthest side from the light source 14, even when a delay occurs in the optical response at the light output element 15_N+1, which is one scanning position before the light output element 15_N, after the selection, most of the amount of light which can be output is emitted at the light output element 15_N. Therefore, compared to the above FIG. 7A, amount of light leakage can be sufficiently suppressed. The said effect is not only exercised for the light output element 15_N+1, but can also be expected in the case of which optical response delay occurs at any light output elements including light output elements 15_N+2, 15_N+3, . . . , and up to 15_Y.

Figure 8:
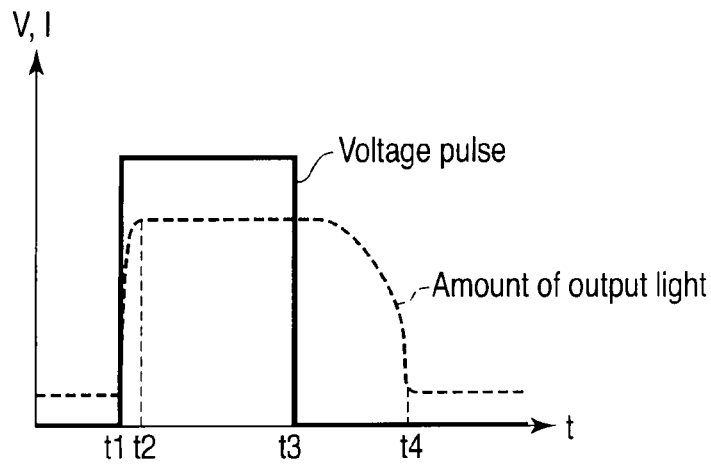
FIG. 8 shows an example of a driving waveform in the case where optical response delay occurs.
Figure 9:
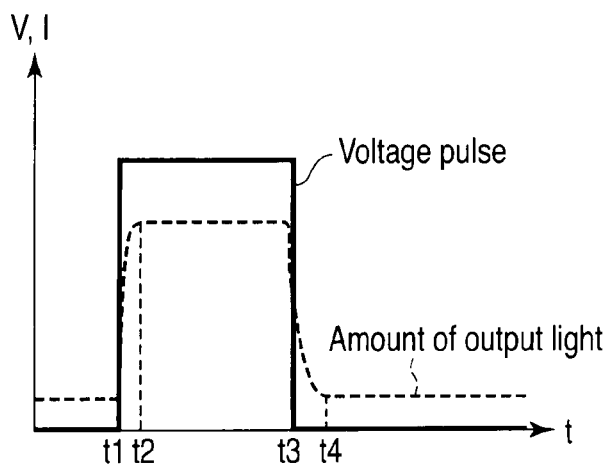
FIG. 9 shows an example of a driving waveform in the case where there is less optical response delay.

FIG. 8 shows a driving waveform example in a case where an optical response delay of the light output element 15 occurs. Further, this light output element 15 is considered to optically respond by applying voltage. For example, when the light output element 15 is applied a voltage pulse during a t1 to t3 period as shown in FIG. 8, it shows optical response during a t1 to t4 period. In this case, a t3 to t4 period is the period in which the optical response delay occurs in, i.e., the period in which the optical response differs from electric signal from the scanning line. This causes deterioration in display characteristics such as degradation in contrast. Therefore, generally, it is desired that the driving voltage pulse coincides with the optical response as much as possible as shown in FIG. 9, i.e., that the t1 to t2 period and the t3 to t4 period are as short as possible. However, in the case of performing light output by the displacement as shown in the present embodiment, it is difficult to bypass delay caused by displacement response.

Figure 10:
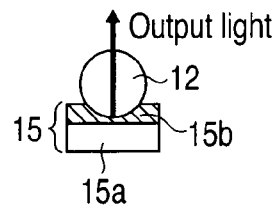
FIG. 10 is a schematic view showing the performance of a light output element using a deformable optical function layer.

FIG. 10 is a schematic view of a factor which causes response delay due to the above mentioned displacement. In other words, it is a configuration example of using a highly refractive transparent resin having flexibility on the surface of the light output element 15 for an optical function layer 15b shown in FIG. 3B. In the case of using the optical function layer 15b of the configuration as the light output element 15, the contact between the optical waveguide 12 and the light output element 15 can be improved in accordance with the stress applied by the displacement device 15a. In other words, since the optical function layer 15b can be easily deformed in accordance with the shape of the optical waveguide 12, contact is possible without any gaps, and, simultaneously, the contact area of the optical function layer 15b and the optical waveguide 12 can be increased. Therefore, it is possible to increase the area contributing to the light output. Since, the output efficiency of light propagating in the optical waveguide 12 can be enhanced by, for example, the area rate, this becomes an advantage as a display apparatus. However, when light output is stopped, i.e., when the displacement device 15a departs from the optical waveguide 12, the optical function layer 15b undergoes plasticity deformation. Therefore, in comparison to the displacement device 15a performance, a delay occurs for the optical function layer 15b to depart from the optical waveguide 12. That is, an optical response delay will occur during t3 to t4 as shown in FIG. 8. However, by applying the present embodiment, it will be possible to bypass the deterioration in display characteristics caused by this optical response delay.

FIG. 11 shows a configuration example of applying the display apparatus according to the present embodiment to a system such as a television receiver. This system is provided with a display panel 1, a power supply circuit 2, an image processing circuit 3, a scanning inversion processing circuit 4 and a memory 5. The display panel 1 corresponds to, for example, the display apparatus shown in the above mentioned FIG. 1. The power supply circuit 2 supplies driving power to the display panel 1, the image processing circuit 3 and the scanning inversion processing circuit 4. The image processing circuit 3 expands image signals input in an order corresponding to the usual scanning direction which scans from the side of the light sources 14 in FIG. 1 for each frame in the memory 5. The scanning inversion processing circuit 4 inverts the image signals expanded in the memory 5 in an order corresponding to a direction opposite the usual scanning direction and outputs the signal to the display panel 1. Further, the image processing circuit 3 and the scanning inversion processing circuit 4 have their processes synchronized by a synchronizing signal. In this manner, it becomes possible for the driving circuit 10 in FIG. 1 to drive the scanning line in accordance with a video signal which is in an order corresponding to a direction opposite the propagating direction of the light signal from the light source 14, so as to correspond to the driving order of the scanning line 11.

Figure 13A:
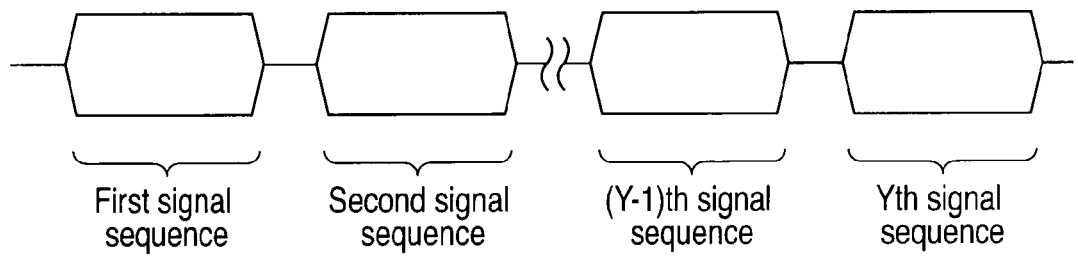
FIG. 13A shows a signal sequence of a usual video signal.
Figure 13B:
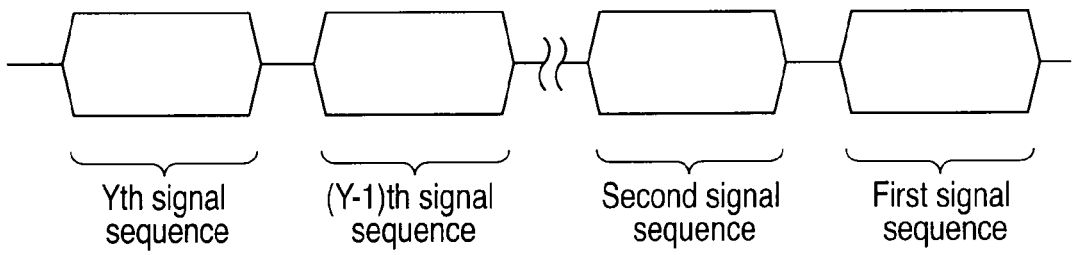
FIG. 13B shows a signal sequence after conversion by a scanning inversion processing circuit.
Figure 14:
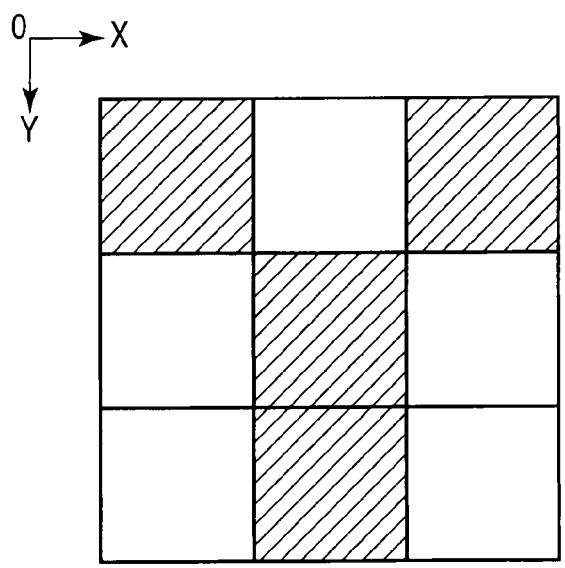
FIG. 14 shows an example of a display image.

In other words, in a usual display apparatus, a video signal having X×Y pixels as shown in FIG. 12 has a signal sequence set in the order of line 1 to line Y as shown in FIG. 13A. In contrast, in the present embodiment, the scanning inversion processing circuit 4 inverts the signal sequence of the video signal shown in FIG. 13A into the order of line Y to line 1 as shown in FIG. 13B. For example, in the case of displaying a binary image having 3×3 pixels as shown in FIG. 14 on the display apparatus, the scanning inversion processing circuit 4 inverts the signal sequence in a usual form as shown in the upper part of FIG. 15 into a signal sequence shown in the bottom part of FIG. 15 and displays it on a display panel 1. By adding this scanning inversion processing circuit 4, it becomes possible to introduce a usual video source directly in the display apparatus without having it processed.

In the above mentioned display apparatus, it is favorable to have the driving circuit 10 drive a scanning line 11 which is furthest from the light source 14 after a predetermined blank period has elapsed from a time when a scanning line 11 which is nearest from the light source 14. In this manner, it is possible to reduce the optical response delay after the performance of the light output element 15_1, which is the light output element 15 nearest to the light source 14, i.e., after the scanning carried out by the scanning line 11 nearest to the light source 14. The driving circuit 10 inserts a blank period which is longer than the t3 to t4 period in FIG. 8 after scanning is carried out from the light output element 15_Y to the light output element 15_1, which is during one frame of video information. This allows the light output element 15_1 to restore the optical response delay during the blank period. Therefore, when refreshing with a next frame of the video information to scan the light output element 15_Y anew, the amount of light guided through the optical waveguide 12 can bypass the influence by the light leakage at the light output element 15_1.

Further, the above mentioned blank period can be adopted not only for the case of the light output element 15_1, but also between other light output elements. For example, in order to reduce the optical response delay of the light output element 15, it is fine to have the driving circuit 10 drive the scanning lines 11 sequentially at intervals of a blank period in which no scanning line is carried out. In the case where the t3 to t4 period in FIG. 8 is significantly shorter than the scanning period, light leakage can be attempted to be reduced by inserting a blank period which corresponds to a period longer than the t3 to t4 period after each scanning period.

Further, the present invention is not limited to the embodiment shown in FIG. 1. Therefore, for example, as shown in FIG. 16, it is fine to provide a scanning line driving circuit 17 to drive the scanning lines and a light source driving circuit 18 to drive the light source 14 separately, as substitute for the driving circuit 10 in FIG. 1.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display apparatus comprising:
   a plurality of light sources which are arranged in a first direction and emit light beams;
   a plurality of optical waveguides which are arranged in the first direction and guide the light beams, each of the optical waveguides extending in a second direction intersecting with the first direction, wherein each of the light beams is guided into the intersecting optical waveguide in the second direction;
   a plurality of scanning lines which are arranged in the second direction so as to intersect with the optical waveguides;
   a plurality of light output elements which are arranged on the scanning lines configured to be in contact with the optical waveguides to output the light beams, each of the light output elements being deformable in accordance with a cross-sectional shape of each of the optical waveguides to outside of the apparatus by electric signals from the scanning lines; and
   a scanning line driving unit which drives the scanning lines in a third direction opposite to the second direction.

2. The apparatus according to claim 1, wherein the scanning line driving unit drives the scanning lines sequentially from a scanning line which is furthest from the light sources.

3. The apparatus according to claim 1, wherein the scanning line driving unit drives the scanning lines sequentially at intervals of a predetermined blank period.

4. The apparatus according to claim 1, wherein the scanning line driving unit drives a scanning line which is furthest from the light source after a predetermined blank period has elapsed from a time when a scanning line which is nearest from the light source.

5. The apparatus according to claim 1, which further comprises
   an inverting unit which inverts an inputting order of video signals inputting in the light guiding direction; and
   a light source driving unit which drives the light sources in accordance with the inverted video signals.

6. The apparatus according to claim 1, wherein the light output elements include a plastically-deformable optical function layer on a surface which is in contact with the optical waveguides.

7. The apparatus according to claim 1, wherein the light beams are taken out on a display surface from the optical waveguides, the light beams being emitted in a third direction other than the first direction and the second direction.

8. A method of driving a display apparatus which comprises a plurality of light sources which are arranged in a first direction and emit light beams, a plurality of optical waveguides arranged in parallel with the first direction and guiding the light beams, each of the optical waveguides extending in a second direction intersecting with the first direction, wherein each of the light beams is guided into the intersecting optical in the second direction, a plurality of scanning lines arranged in the second direction so as to intersect with the optical waveguides, and a plurality of light output elements, arranged on the scanning lines configured to be in contact with the optical waveguides, the method comprising:
   driving the scanning lines in a third direction opposite to the second direction, and
   outputting, by the light output elements, the light beams to outside of the apparatus by electric signals from the scanning lines, each of the light output elements being deformable in accordance with a cross-sectional shape of each of the optical waveguides.

9. The method according to claim 8, wherein the scanning lines are driven sequentially from a scanning line which is furthest from the light sources.

10. The method according to claim 8, wherein the scanning lines are driven sequentially at intervals of a predetermined blank period.

11. The method according to claim 8, wherein, after a predetermined blank period has elapsed from a time when a scanning line which is nearest from the light source is driven, a scanning line which is furthest from the light source is driven.

12. The method according to claim 8, further comprising:
inverting an inputting order of video signals inputting in the light guiding direction; and
driving the light sources in accordance with the inverted video signals.

13. The method according to claim 8, wherein the light output elements include a plastically-deformable optical function layer on a surface which is in contact with the optical waveguides.

14. The apparatus according to claim 1, wherein the light sources are arranged between the scanning line driving unit and the optical waveguides.

* * * * *